US006766871B2

(12) United States Patent
Sawyer

(10) Patent No.: US 6,766,871 B2
(45) Date of Patent: Jul. 27, 2004

(54) ATTACHMENT MEANS FOR ATTACHING A WHEELCHAIR TO A MOTORIZED APPARATUS

(76) Inventor: George S. Sawyer, 2711 Cottonwood Walk, Spring, TX (US) 77388

(*) Notice: Subject to any disclaimer, the term of this patent is extended or adjusted under 35 U.S.C. 154(b) by 0 days.

(21) Appl. No.: 10/185,237

(22) Filed: Jun. 27, 2002

(65) Prior Publication Data

US 2004/0000440 A1 Jan. 1, 2004

(51) Int. Cl.[7] ........ B60K 1/00
(52) U.S. Cl. ........ 180/13; 180/211
(58) Field of Search ........ 180/11, 12, 13, 180/211; 280/304.1

(56) References Cited

U.S. PATENT DOCUMENTS

| | | | | |
|---|---|---|---|---|
| 2,978,053 A | * | 4/1961 | Schmidt | 180/12 |
| 3,912,032 A | | 10/1975 | Benz et al. | |
| 3,921,744 A | | 11/1975 | Benoit et al. | |
| 4,386,672 A | | 6/1983 | Coker | |
| 4,503,925 A | | 3/1985 | Palmer et al. | |
| 4,518,057 A | * | 5/1985 | McCallum | 180/210 |
| 4,961,473 A | | 10/1990 | Jones | |
| 5,016,720 A | | 5/1991 | Coker | |
| 5,050,695 A | | 9/1991 | Kleinwolterink, Jr. | |
| 5,113,959 A | | 5/1992 | Mastov et al. | |
| 5,135,063 A | | 8/1992 | Kropf | |
| 5,186,269 A | | 2/1993 | Avakian | |
| 5,207,286 A | | 5/1993 | McKelvey | |
| 5,222,567 A | | 6/1993 | Broadhead et al. | |
| 5,291,959 A | | 3/1994 | Malblanc | |
| 5,293,950 A | | 3/1994 | Marliac | |
| 5,351,774 A | | 10/1994 | Okamoto | |
| 5,494,126 A | | 2/1996 | Meeker | |
| 5,495,904 A | | 3/1996 | Zwaan | |
| 5,531,284 A | | 7/1996 | Okamoto | |
| 5,651,422 A | | 7/1997 | Casali | |
| 5,826,670 A | | 10/1998 | Nan | |
| 6,481,514 B2 | * | 11/2002 | Takada | 180/11 |

FOREIGN PATENT DOCUMENTS

| | | | | | |
|---|---|---|---|---|---|
| EP | 0128448 A2 | | 5/1984 | | |
| EP | 0561986 B1 | | 12/1991 | | |
| EP | 0770371 A1 | | 9/1996 | | |
| JP | 63212185 A | * | 9/1988 | B62D/63/02 |
| JP | 06099793 A | * | 4/1994 | B60S/9/02 |

* cited by examiner

*Primary Examiner*—Kevin Hurley
(74) *Attorney, Agent, or Firm*—Browning Bushman, PC; Carlos A. Torres

(57) ABSTRACT

A powered propulsion apparatus that is attachable to and detachable from, a wide range of conventional wheelchairs without modification of the propulsion apparatus or the wheelchairs. The propulsion apparatus converts a conventional manually powered wheelchair into a power driven wheelchair. The apparatus clamps to the front wheels of a conventional wheelchair with a clamping mechanism that is adjustable to accommodate a wide range of wheel-spacings and wheel sizes and accommodates an inexactitude of alignment between the clamps and the wheelchair. The clamping mechanism secures the wheel chair to the propulsion apparatus without damage or stress to the wheelchair components.

9 Claims, 7 Drawing Sheets

ATTACHMENT MEANS FOR ATTACHING A WHEELCHAIR TO A MOTORIZED APPARATUS

BACKGROUND OF THE INVENTION

1. Field of Use

The present invention relates to power units used to drive manually operated conventional wheelchairs, and more particularly, to novel power units that are automatically operated from a control switch to be attachable to and detachable from conventional wheelchairs for producing power driven wheelchairs.

Attachable power systems for manually operated wheelchairs are well known in the art. Various configurations have been designed with a variety of attachment methods, control methods, and detachment methods that allow the wheelchair to be converted back to a conventional manually operated wheelchair.

In all instances of prior art design known to the inventor the conventional wheelchair must be fitted with brackets, clamps, bars or sockets, or the apparatus must be pre-sized and manually configured to be custom fitted to a particular variant of a conventional manually operated wheelchair. In particular instances, the rear wheels must be removed to add specialized hubs, or powered hubs are added with the rear wheels still attached. In many instances of the prior art, both wheelchair modifications and pre-sizing of the power apparatus are required to adapt the power apparatus to the wheelchair. Adding attachment accessories to the wheelchair or having to pre-size the assembly requires tools, time and intervention on the part of the user or others that severely limits the convenience of use of the apparatus.

In the instances of a powered apparatus mounted under the wheelchair, the frame of the wheelchair has been the preferred location of attachment. Using the frame for attachment can place lateral or torsional stress on the frame of the wheelchair limiting the service life of the wheelchair. In many cases, holes must be drilled into the frame of the wheelchair to accommodate the attachment means, further limiting the service life of the wheelchair. Wheelchair users are very protective of their wheelchairs and are reluctant to make alterations or add attachments that may damage or reduce the service life of their wheelchair.

Although often referred to as "standard", conventional wheelchairs of the manually operated type are manufactured by more than 60 different companies worldwide and embody significant variations in height, width, and frame layout. These variations have heretofore represented a difficult challenge to the manufacture of a universal or near-universal power apparatus that can be quickly and securely attached and detached from a wide variety of conventional manually operated wheelchairs.

If a wheelchair power apparatus is only going to be used by an individual user on a single specific wheelchair then the inconvenience represented by prior art designs is limited in frequency. However if the power apparatus is to be used by different wheelchair users with different wheelchairs on a regular basis, such as in a retail sales environment, then the inconvenience imposed by prior art designs becomes intolerable. Retrofitting of the wheelchair or pre-sizing of the device places a difficult burden on the user.

2. Background Setting of the Prior Art

Various types of electrical motor or engine powered drive units for wheelchairs are known or proposed in the prior art.

U.S. Pat. No. 3,921,032 describes a front mounted drive apparatus that attaches to tubes that have been added to a conventional wheelchair in proximity to the armrests of the wheelchair. A ramp is used to raise the front wheels of the wheelchair, thus raising the receiving tubes to match the attachment bars of the apparatus. The apparatus is manually aligned by the user or attendant to receive the attachment bars.

U.S. Pat. No. 3,921,744 proposes a device that uses added receiving sockets mounted on the outer front frame of the wheelchair.

U.S. Pat. No. 4,386,672 proposes an apparatus that mounts to the under frame and crossbars of a foldable wheelchair. The apparatus width is preset. The user or attendant manually aligns and attaches a connector beneath the seat of the wheelchair. Throughout the prior art, one sees devices that require excessive intervention either by the user or a second party to prepare the propulsion device or the wheelchair for addition of a drive mechanism.

In a video by Stand Aid of Iowa Inc. describing a device called "Roll-Aid", special brackets and lift bar are used to retrofit the wheelchair. Once retrofitted, the wheelchair is ready to accept the attachment of the Roll-Aid powering device. The wheelchair is rolled forward over the Roll-Aid and the brakes of the wheelchair are locked. The Roll-Aid is then put into reverse and attaches to the lift bar that was retrofitted to the wheelchair. A release cord is picked up off the ground and tied to the backrest or arm of the wheelchair.

Once the apparatus is attached, the brakes are released from the wheelchair and the Roll-Aid is ready to be put to use. When detachment is desired, the user locks the brakes on the wheelchair, reaches around the back or side of the wheel chair and manually manipulates the release cord. The video illustrates that the release cord is tied to the arm of the wheelchair as an attachment.

The lift bar required in the Roll-Aid retrofitting may prevent a foldable wheelchair from being folded until the bar is removed.

In the paper entitled "Manual Wheelchair Propulsion" obtained from the web site cosmos.buffalo.edu/t2rerc, the author points out "Experts and industry contacts mentioned power assisted add on units for manual wheelchairs as an area for further technology development and improvement." A selection of specifically noted problems with current art include:

- Adding a power assist unit to a manual wheelchair will increase the weight of the wheelchair and may offset the distribution of mass or balance and center of gravity, possibly making it more difficult for the user to propel when the power assist is disengaged.
- Heavy power assist units can stress the wheelchair frame if the wheelchair is not specifically designed to accommodate the unit.
- Some of the units are cumbersome to attach and detach, requiring the assistance of a second person.

A selection of specific issues to consider in the area of improved power assisted propulsion technology noted in the report include:

- Can the products work across a wide range of wheelchairs?
- Can the unit be easily engaged and disengaged as a function of power demand?
- Can the products be less cumbersome to attach and detach?

As will be seen in the sections that follow, the apparatus of the present invention addresses these areas of needed technological improvement noted by the University at Buffalo and addresses additional deficiencies noted in the prior art.

SUMMARY OF THE INVENTION

The primary object of the present invention is to provide a power apparatus for a conventional manually operated wheelchair that is easily attached to the wheelchair by the unassisted user without the use of tools and that is readily adaptable across the broad range of wheelchair widths, heights, and frame layouts currently on the market.

It is a further object of the present invention to provide an attachable power apparatus for a conventional manually operated wheelchair wherein the power apparatus self adjusts to attach to the front wheels of wheelchairs having various front wheel spacings, front wheel thicknesses, and front wheel diameters.

It is a further object of the present invention to provide an attachable power apparatus for a conventional manually operated wheelchair wherein the power apparatus has a very low center of gravity to provide for greater stability and safety. The apparatus of the present invention is attached to the wheelchair at the lowest possible point to improve the stability of a standard manually operated wheelchair when in use.

It is a further object of the present invention to provide an attachable power apparatus for a conventional manually operated wheelchair that allows the wheelchair to be turned in a radius defined by the length of the overall assembly of the wheelchair and the power apparatus when the apparatus is attached.

It is a further aim of the present invention to provide an attachable power apparatus for a conventional manually operated wheelchair that includes ramps to allow the front wheels of the wheelchair to ride up onto the apparatus, said ramps retracting from a deployed position to a non-deployed position until needed for dismount of the wheelchair from the apparatus.

It is a further object of the present invention to provide an attachable power apparatus for a conventional manually operated wheelchair that allows the user a degree of inexactitude in the wheelchair alignment with the apparatus before attachment.

It is a further object of the present invention to provide an attachable power apparatus for a conventional manually operated wheelchair that does not produce any lateral or torsional stress on the frame of the wheelchair when the apparatus is attached to the wheelchair.

The present invention provides a battery powered steerable tractor apparatus that includes a powered, self-adjusting attachment means allowing the apparatus to be interchangably attached to a broad range of conventional manually operated wheelchairs without the need for adding fittings to the wheelchair or manually pre-sizing the apparatus. As used herein, the term “tractor” is intended to include a pulling device as well as a pushing or supporting device that has the capability to move a wheelchair or other wheeled object.

A preferred form of the tractor apparatus of the present invention comprises a steerable wheel and controllable drive system, a pair of powered adjustable clamping means for attachment to the front wheels of a conventional wheelchair, a pair of self-contained ramps to position the front wheels of a manually operated wheelchair between the clamps of the attachment means, a powered linear actuator to activate the clamping means, one or more electric batteries or other suitable portable electrical power source, and trailing support wheel (or wheels) at the rear of the drive system.

The apparatus of the present invention attaches to a conventional manually operated wheelchair at the lowest possible point, the bottom of the front wheels. This method of attaching the tractor to the wheelchair produces an extremely low overall center of gravity in the resulting combined assembly. When the tractor apparatus is attached to a conventional wheelchair, the center of gravity of the unified wheelchair and apparatus is substantially lower than the center of gravity of a wheelchair alone. Accordingly, adding the tractor apparatus of the present invention to a wheelchair improves the stability of the wheelchair. This low center of gravity ensures stability in mount, use and dismount. Specifically, when in use, the tractor apparatus actually adds weight beneath the wheels of the wheelchair and lowers the overall center of gravity of the combined unit, improving stability.

The preferred embodiment of the present invention includes independent floating clamps that allow for a significant degree of inexactitude in placement of the front wheels of the wheelchair when mounting the wheelchair into engagement with the tractor drive device. Each of the clamps is free to move independently when activated to locate the object front wheel and apply clamping force to the wheel. This novel approach produces no lateral tensioning of the wheelchair frame or tires.

The apparatus of the present invention is applicable to manually operated wheelchairs of both the foldable and non-foldable types. The attachment mechanism of the present invention offers no interference with the foldability of a foldable wheelchair when not attached to the wheelchair.

The method of the present invention uses soft, conforming clamping means to engage the lower portion of the front tires, rim and spokes of the front wheels of a conventional manually operated wheelchair. The clamping surfaces are designed to provide a firm grip when in the clamped position without risking damage to tires, rims or spokes of the front wheels of the wheelchair.

The present invention provides free-floating wheel clamps that move independently of each other to accommodate front wheelchair wheels of various spacings and widths.

In the preferred embodiment, the tractor apparatus of the present invention provides a steering column with a handlebar, a speed control, a drive motor, a switch plate with a power switch and an electrical clamp control switch. The clamp control switch allows the user to activate the clamping means through the simple flip of the switch.

In an alternative embodiment, a joystick coupled with a powered steering mechanism can be substituted for the handlebars and speed control. The joystick embodiment employs a single steering and speed switch plus a switch to activate the clamping mechanism.

In yet another embodiment of the invention, the wheelchair is mounted upon a self-powered platform incorporating the novel front wheel clamping arrangements of the present invention.

The preferred form of the tractor apparatus of the present invention allows for threshold clearance of more than 1" for home use. It can accommodate a large range of inclines. The apparatus controls provide self-braking when moving forward on a downgrade. The apparatus can be steered, stopped, and speed controlled in both the forward and reverse directions.

The tractor apparatus of the present invention offers the ease of use and control of a powered scooter while permitting the user to remain in the user's personal, manually propelled wheelchair without the need to transfer to a scooter. Transferring to a scooter can be quite challenging and uncomfortable for the user and can lead to mishaps. With the apparatus of the present invention, the users maintain use of their own wheelchairs, which oftentimes are custom made and adapted to meet individual requirements.

The apparatus of the present invention is especially applicable in assisting wheelchair bound patrons to move about a retail environment. The user of a manual wheelchair can roll up onto a waiting tractor apparatus and attach to the apparatus with the simple flick of a switch. The user is then free to use the power unit to provide controlled motive power to the wheelchair while shopping. Since the user can achieve the clamping of the wheelchair without assistance and can further operate the powered wheelchair without assistance, anyone accompanying the user is free to pursue other activities.

When a user has finished with the apparatus, the user simply detaches and rolls off. A second user, even one with a differently sized wheelchair with a different distance between front wheels, can roll up onto and attach to the unit vacated by the first user. The second user switches on the clamping device and achieves secure clamping without having to manually modify the wheelchair or the tractor apparatus.

This ability to accommodate wheelchairs of various configurations overcomes many limitations imposed by prior art propulsion devices. The tractor apparatus of the present invention will additionally find ready use and fleet efficiencies in nursing homes, hospitals, sports venues, airports, and other public gathering places.

The platform version of the present invention permits a wheelchair to be fully supported above the rolling surface independently of the wheelchair wheels. The wheeled platform can provide greater mobility and a reduced turning radius as well as other maneuvering and control advantages.

The foregoing objects, features and advantages, as well as others, will be more fully understood and better appreciated by reference to the following drawings, specification and claims.

DESCRIPTION OF THE ILLUSTRATED EMBODIMENTS

Figure 1:
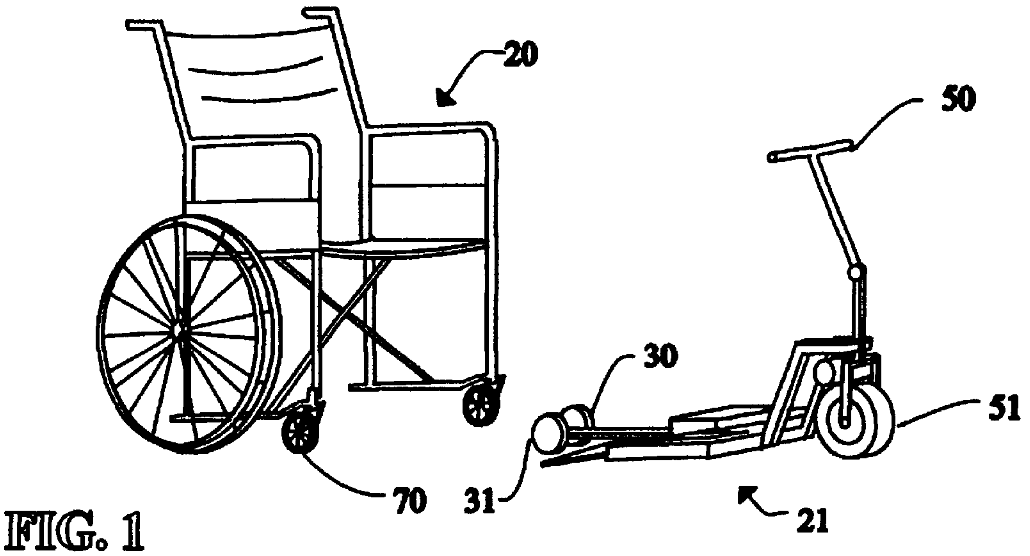
FIG. 1 is a perspective view of a battery-powered tractor apparatus in accordance with the present invention in proximity to a conventional, manually operated wheelchair.

Referring now to Table 1, shown are measurements of key physical wheel spacing and tire attributes of various wheelchairs in general use. The table reveals broad variations in height, width, wheel diameter, and attribute interrelationships that exist among conventional manually operated wheelchairs.

Table 1 shows a broad sampling of 23 different commercially available wheelchairs and provides key physical measurements, in inches, of specific attributes of each chair. The wide variations displayed in Table 1 are significant. The existence of these variations among wheelchair models has heretofore presented a significant challenge to manufacturers of devices intended for adding a motive power to conventional wheelchairs.

TABLE 1

| Chair No. | Distance between Front Tires | Diameter of Front Tires | Width of Front Tires | Height of Cross Section From Ground at Center Point | Height of Cross Section from Ground at Side Frame | Width of Frame at Cross Section |
|---|---|---|---|---|---|---|
| 1 | 18.701 | 8.307 | 1.063 | 11.850 | 5.039 | 17.638 |
| 2 | 18.898 | 7.992 | 1.102 | 13.071 | 8.465 | 16.142 |
| 3 | 17.756 | 8.071 | 1.102 | 11.614 | 4.882 | 14.685 |
| 4 | 21.457 | 7.126 | 1.181 | 11.260 | 7.047 | 17.480 |
| 5 | 17.126 | 4.921 | 0.984 | 11.693 | 7.835 | 13.228 |
| 6 | 19.094 | 8.110 | 1.024 | 12.283 | 8.504 | 15.472 |
| 7 | 19.488 | 7.480 | 1.181 | 13.189 | 9.055 | 15.945 |
| 8 | 19.134 | 7.480 | 1.220 | 14.173 | 10.236 | 15.748 |
| 9 | 19.094 | 7.874 | 0.984 | 10.433 | 3.346 | 16.457 |
| 10 | 18.110 | 7.480 | 0.984 | 13.189 | 8.071 | 14.961 |

TABLE 1-continued

| Chair No. | Distance between Front Tires | Diameter of Front Tires | Width of Front Tires | Height of Cross Section From Ground at Center Point | Height of Cross Section from Ground at Side Frame | Width of Frame at Cross Section |
|---|---|---|---|---|---|---|
| 11 | 18.898 | 7.874 | 0.984 | 10.827 | 3.346 | 16.457 |
| 12 | 19.094 | 7.874 | 1.024 | 11.024 | 4.724 | 15.748 |
| 13 | 18.110 | 7.874 | 0.984 | 11.417 | 4.724 | 15.276 |
| 14 | 17.992 | 7.874 | 0.984 | 12.992 | 7.874 | 15.039 |
| 15 | 18.110 | 7.874 | 1.142 | 11.204 | 4.528 | 15.157 |
| 16 | 18.898 | 7.874 | 0.984 | 10.827 | 3.346 | 15.945 |
| 17 | 19.173 | 7.874 | 0.984 | 10.827 | 3.346 | 16.260 |
| 18 | 19.370 | 7.874 | 0.984 | 10.630 | 3.346 | 16.142 |
| 19 | 18.031 | 7.874 | 0.984 | 12.992 | 8.071 | 15.354 |
| 20 | 20.394 | 7.874 | 1.102 | 11.024 | 4.646 | 17.244 |
| 21 | 18.898 | 7.874 | 0.984 | 11.220 | 4.528 | 14.764 |
| 22 | 18.504 | 7.874 | 0.984 | 10.630 | 4.528 | 15.945 |
| 23 | 18.898 | 7.874 | 0.984 | 11.024 | 4.528 | 16.024 |

The sampling of conventional manually operated wheelchairs is representative of a substantial majority of all manual wheelchairs currently in use. The sampling excludes specialized manually operated wheelchairs designed specifically for small children, obese persons, or sport or racing activities. Although the preferred embodiment of the present invention excludes these specific types of wheelchairs, it is evident that the current invention could be manufactured in a configuration that would be as useful with all of these types as well as with more conventionally sized wheelchairs.

Variations in wheelchair attributes have heretofore been addressed by either manually pre-sizing a motorized attachment to prepare it for attachment to a specific conventional wheelchair or by retrofitting a specific wheelchair with a specially configured attachment means. Manually pre-sizing of a motive device presents a challenge to the user, and a significant inconvenience. Adding components to adapt the wheelchair or the powering device also inconveniences the user and creates an intolerable burden in public environments such as retail stores. In many instances in the prior art, the use of specific attachments added to the wheelchair may prevent a foldable wheelchair from being folded until the attachment is removed. This presents yet another inconvenience to the user.

In the prior art, pre-sizing of the device or adding attachments such as rods, bars, tubes or flanges to the wheelchair requires precise location and dimensioning to obtain proper attachment of the device to the wheelchair. This level of precision presents yet another significant challenge to the user.

The present invention is capable of being attached to each and every wheelchair in the sample displayed in Table 1 without the need for manual pre-sizing of the tractor apparatus or retrofitting a specific wheelchair with an attachment device.

Specifically, the apparatus of the present invention can accommodate wheelchairs with distance between front wheel widths ranging from as narrow as 17.126 inches and as wide as 21.457 inches. In addition, the apparatus of the present invention can accommodate wheelchairs as shown in Table 1 with variations in front wheel outer diameter ranging from the smallest diameter of 4.921 inches to the largest diameter of 8.307 inches. Beyond the scope of Table 1, wheelchairs with front wheel diameters as small as 2.500 inches can be accommodated by the invention.

Figure 2:
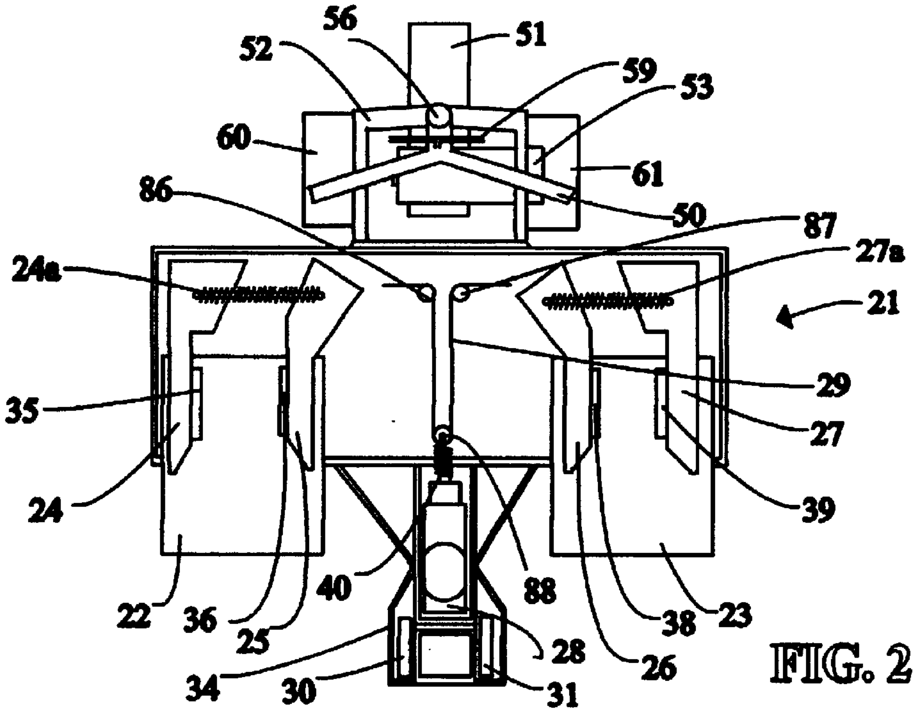
FIG. 2 is a top view of the tractor apparatus of FIG. 1 with the powering batteries removed.
Figure 9:
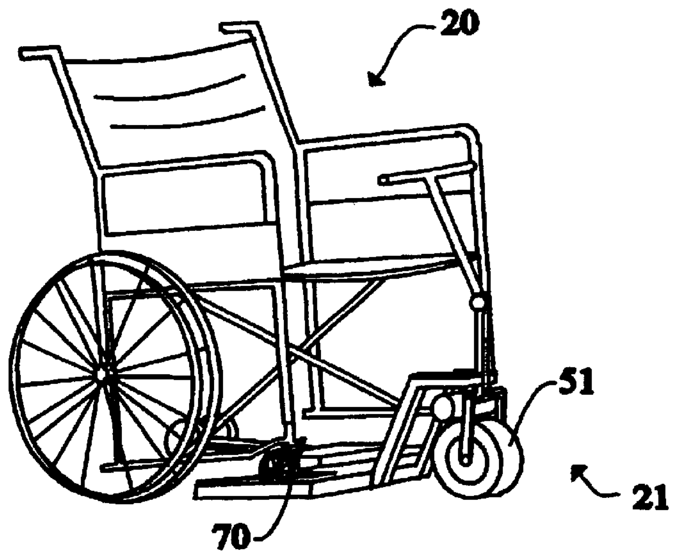
FIG. 9 is a perspective view of a tractor apparatus of the present invention mated to a conventional wheelchair.

A tractor apparatus of the present invention, indicated generally at 21 in FIGS. 1, 2, and 9, is a remotely and adjustably attachable self-powered drive system for use with a conventional manually propelled wheelchair 20. As will be described in detail below, the tractor apparatus 21 embodies all of the components necessary to attachably accept a conventional manually operated wheelchair 20 and provide a steerable power drive system to the wheelchair. The wheelchair can be just as easily detached from the apparatus and returned to manual use.

Referring jointly to FIGS. 1, 2 and 9, a left ramp 22 and right ramp 23 provide the means for the front wheels of a conventional wheelchair to roll up on the tractor apparatus 21 and into a position to be attached to the apparatus by means of four clamps. These four clamps are best illustrated in FIG. 2 as left outboard clamp 24, left inboard clamp 25, right inboard clamp 26, and right outboard clamp 27.

The four clamps are held open by springs 24*a*, and 27*a* until activated to close by an electric linear actuator 28. The actuator 28 draws a cable 29 through a spring-biased idler pulley 88 drawn by a spring connection 40 to close the four clamps 24, 25, 26, and 27 about the front wheels of a wheelchair. The clamps carry moldable soft clamp pads that conform to the sides of the front tires of a conventional wheelchair when the clamps are closed. These clamp pads are numbered in FIG. 2 as 35, 36, 38, and 39. A spring 24*a* resists the closing action of the clamps.

With specific reference to FIG. 2, behind the actuator 28, at the rear of the tractor apparatus 21, are deployed two support wheels, left rear wheel 30 and right rear wheel 31. This pair of support wheels acts to provide a rolling support for the rear of the tractor apparatus. A fender housing 34 encloses the rear wheels 30 and 31. The fender housing 34 protects the rear wheels 30 and 31 of the apparatus 21 from becoming entangled with the front wheels of a conventional wheelchair during mounting or dismounting from the apparatus.

Also shown in FIG. 2 are handlebars 50, a drive wheel 51, a drive wheel yoke 52, and a drive motor 53. The drive wheel 51 can be turned perpendicularly to the tractor apparatus allowing the combined apparatus and wheelchair to turn within its own radius when attached to a conventional wheelchair. FIG. 2 shows a top view of a steering bearing system 56 and a speed control 59. The speed control 59 not only allows the user to control the speed of the tractor apparatus and attached wheelchair but also allows for a choice in movement in either the forward or reverse direction. FIG. 2 also illustrates left and right footplates 60 and 61, respectively.

Figure 3:
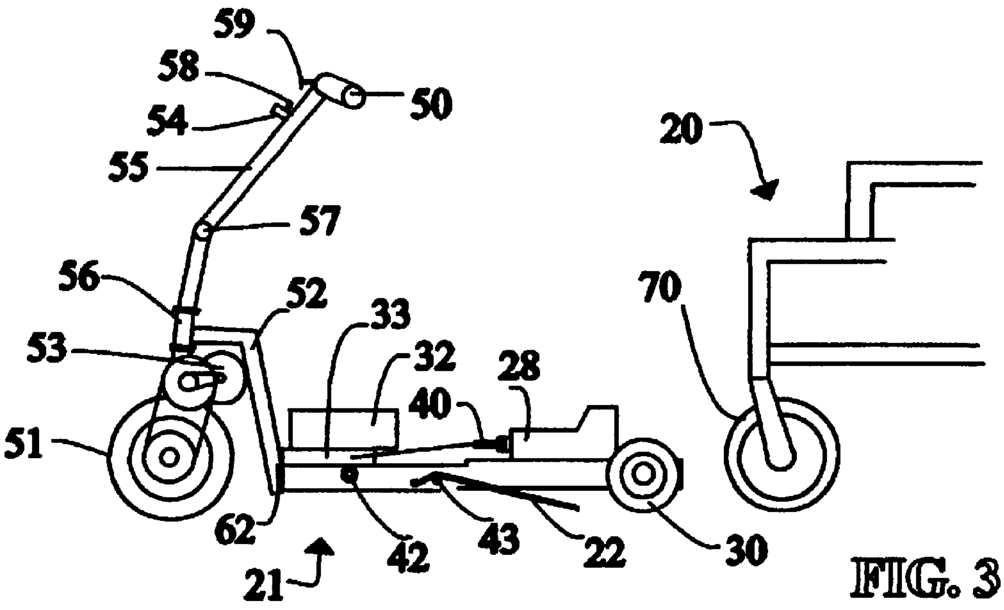
FIG. 3 is a side view of the tractor apparatus of FIG. 1 in proximity to the front of a conventional manually operated wheelchair.

FIG. 3 shows a side view of the tractor apparatus 21 in proximity to a conventional wheelchair 20 before being attached. The wheelchair side view also shows a typical front wheel 70 of a wheelchair. The tractor apparatus 21 carries a gel type battery or other electrical power source 32. The battery 32 can readily be removed for ease of transport of the tractor apparatus or for servicing or replacement of the battery.

FIG. 3 also shows a raise plate 33 that houses the cable draw mechanism used to close the clamping attachment means. Raise plate 33 also provides an attachment platform for the gel battery or other electrical power source 32. Adjacent handlebars 50, mounted on the steering column 55, is a switch plate 54 that carries the switches needed to activate the linear actuator to achieve clamping to the front wheels of a conventional wheelchair, and to activate power to the drive motor 53 of the tractor apparatus 21. The steering column 55 is mechanically connected to a drive wheel yoke 52 by means of a steering bearing system 56. The steering column 55 includes an adjustable pivot point 57 that allows the user to position the handlebars 50 in a location that allows the user comfortable access to the switch plate controls 58 and permits ready manipulation of the handlebars and speed control 59.

In the preferred embodiment, the drive wheel yoke 52 is connected to the remainder of the apparatus 21 with a clamping mechanism 62. The clamping mechanism permits the tractor apparatus to be broken down into three component sections, the drive assembly, the clamping and ramp assembly and the gel battery or other electrical power source 32. This capability permits the tractor apparatus to be broken down for ease of stowing or placement in the trunk or on the seat of an automobile for transport.

Figure 4:
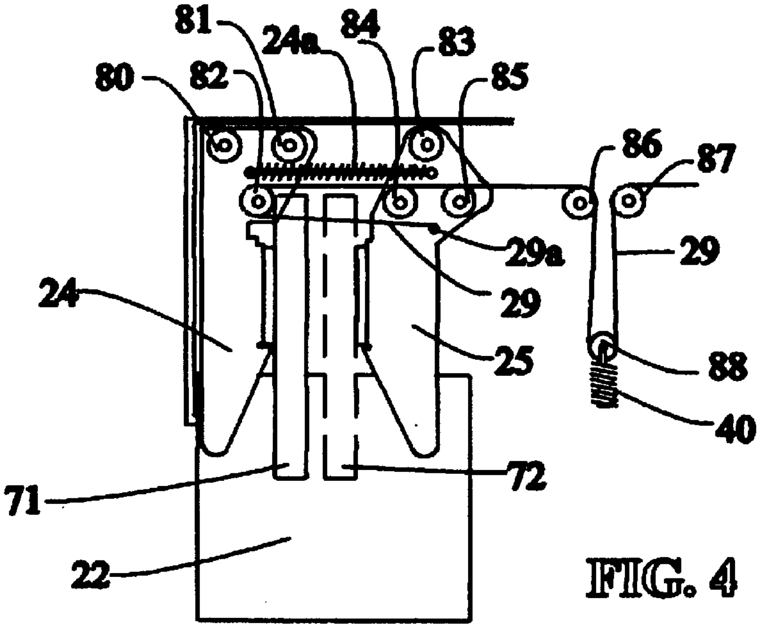
FIG. 4 is a detail top view of one of a pair of clamping means, in open position, showing variations in front wheel width spacing accommodated by the tractor apparatus.

FIG. 4 is a detail top view of the left hand clamping mechanism of the apparatus of the invention. FIG. 4 illustrates an outline of front wheel 71 that is representative of the left hand position of a wheel on a chair having the widest front wheel spacing of a conventional manually operated wheelchair from Table 1. FIG. 4 also shows a dotted line outline of a front wheel 72 that is representative of the position of the left wheel in a chair having the narrowest front wheel spacing of a conventional manually operated wheelchair.

FIG. 4 illustrates significant tensioning pulleys used in the closing system used in actuating the front wheel clamps 24 and 25. The arrangement of the closing system used in actuating the clamps 24 and 25 is analogous to, and symmetrical with, that used to actuate the clamps 26 and 27. The tensioning pulleys include the movable idler pulley 88 having its central mounting axel secured to one end of the idler pulley tensioning spring 40. A cable 29 extends around the idler pulley 88 to fixed tension pulleys 86 and 87. The central mounting axles of the pulleys 86 and 87 are fixed relative to the tractor apparatus 21. As tension in the spring 40 draws the idler pulley 88 away from the pulleys 86 and 87, the wheel clamps 24, 25, 26 and 27 are drawn into clamping engagement with the front wheels of the wheelchair.

The closing system includes a pulley 82 that rotates about a central axel secured to the left clamp 24. The cable 29 extends from the movable idler pulley 88 around the fixed pulley 86 to the left clamp pulley 82 to an attachment point 29*a* on the right clamp 25. The right and left clamp 24 and 25 are mounted on the tractor apparatus 21 with any suitable mounting that permits limited movement of the clamps toward and away from the fixed pulleys 86 and 87. Roller guides 80, 81, 83, 84 and 85 regulate the movement of the clamps 24 and 25 on the transport apparatus 21 to maintain parallel spacing between the gripping pads carried by the clamps.

The linear movement of the idler pulley 88 is applied from the actuator 28 (FIG. 2) by the idler pulley spring 40. The spring connection of the pulley 88 to the actuator accommodates variations in the position and movement of the clamps relative to the main body of the tractor apparatus 21. The compression spring 24*a* is connected between the two clamps 24 and 25 to provide a continuous biasing force tending to separate the clamps 24 and 25 from each other and to move the clamps to their most fully open position on the tractor apparatus 21.

In a preferred embodiment of the present invention, any one of the clamps 24, 25, 26, and 27 is allowed to operate independently of the other three clamps. This capability allows the clamping mechanism to reliably adapt to conventional wheelchairs of the manually operated type with a variety of front wheel spacing and tire widths. In addition, the clamping mechanism can adapt to a degree of inexactitude in the user's line of address as the wheelchair is rolled up onto the apparatus. Even if the user has rolled the wheelchair somewhat to the left of center, between the clamps, or right of center, between the clamps, the clamps will still draw up independently and provide the needed clamping force to attach to the front wheels of the wheelchair.

Figure 5:
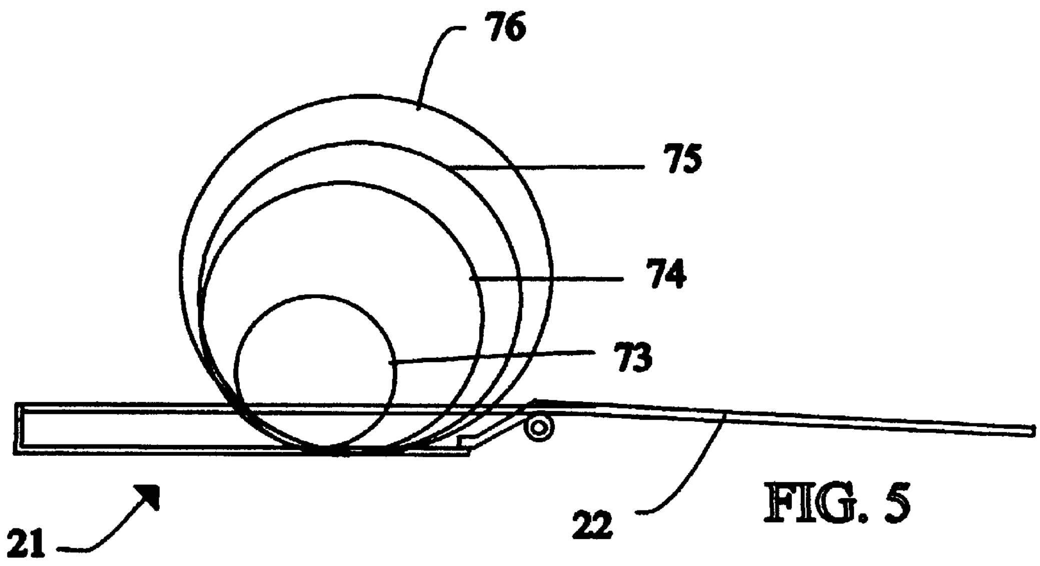
FIG. 5 is a detail side view showing the variations in wheel diameter acceptable by the tractor apparatus.

Turning now to FIG. 5, shown is a side view detail of the tractor apparatus 21 including left side ramp 22. This view shows typical front wheels 73, 74, 75, and 76 of diameters represented in Table 1. The tractor apparatus 21 is shown to accommodate the range of front wheel diameters presented in Table 1. FIG. 5 illustrates the ramp 22 in the retracted position lifted from its lowered position by the weight of the front left wheel of the wheelchair.

Figure 6:
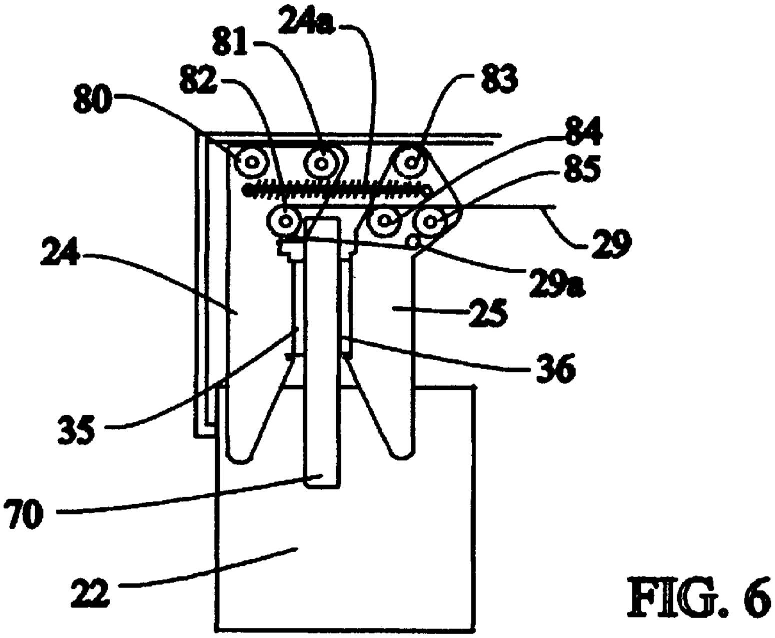
FIG. 6 is a detail top view of one of the pair of clamping means in closed position.

FIG. 6 is also a detail top view of the left side clamping mechanism of the apparatus illustrating the left outboard clamp 24 and left inboard clamp 25 in the closed position. Left outboard clamp pad 35 and left inboard clamp pad 36 are shown in closed and attached engagement with the left front wheel 70 of a conventional wheelchair. Cable 29 extends around pulley 82 and is pulled by the actuator 28 to draw left outboard clamp 24 and left inboard clamp 25 securely into engagement with left front wheel 70 of a conventional manually operated wheelchair. The right hand clamping mechanism mirrors the left hand clamping mechanism illustrated in FIGS. 4 and 6.

Figure 7:
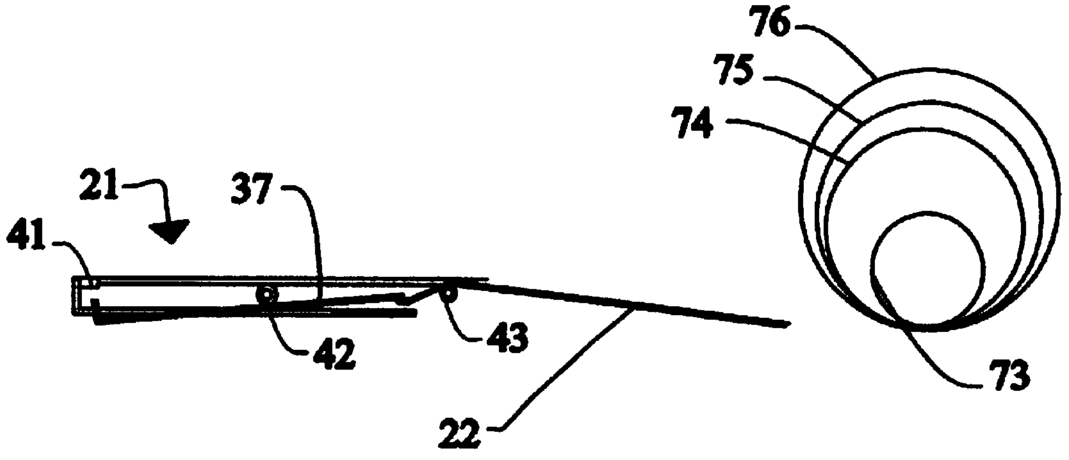
FIG. 7 is a detail side view of a left mounting ramp in position to receive the front wheel of a conventional wheel.

FIG. 7 illustrates a side view detail of the left side of the tractor apparatus 21 of the present invention. FIG. 7 illustrates a range of front wheel diameters 73, 74, 75, and 76 representative of the diameters displayed in Table 1. The various wheel diameters representative of different front wheelchair wheels are illustrated in position before advancing on to the left wheel ramp 22.

A lift actuation plate 37, pivoted about a pivot assembly 42, is illustrated engaging the front end of the ramp 22. The pivot assembly 42 is constructed of a dowel rod bolted through the frame of the tractor apparatus 21. The pivot assembly runs through a matching tube that is part of the ramp lift activation 37. The plate 22 incorporates a tube that encloses a dowel rod bolted to the frame of the tractor apparatus 21 to provide the pivot assembly 43. A lift activation plate stop block 41 is positioned to engage the far end of the plate 37 to limit the pivoting movement of the plate 37. The pivot assemblies 42 and 43 add stiffness and rigidity to the overall frame of the tractor apparatus 21.

Figure 8:
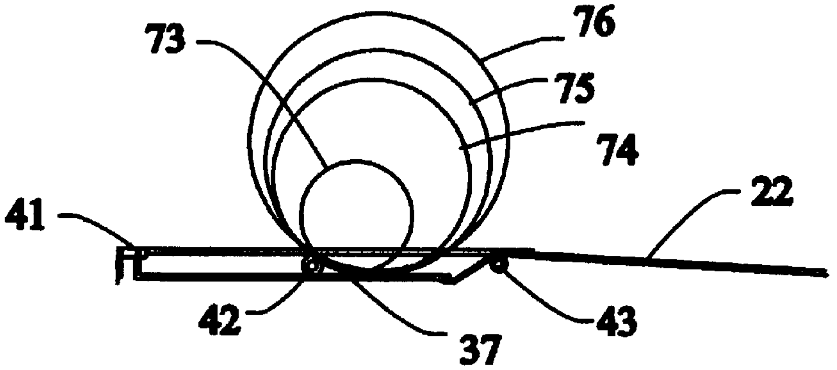
FIG. 8 is a detail side view of a left mounting ramp in a retracted position after receiving the front wheel of a conventional wheelchair.

FIG. 8 illustrates the individual left front wheel of a conventional wheelchair positioned upon the left side ramp lift activation plate 37. The weight of the wheelchair and its occupant pivots the plate 37 against the stop block 41. The rear portion of the plate 37 is pushed downward against the front lip of the ramp 22, pivoting the rearward portion of the ramp, through the use of pivot assembly 43, into the retracted position where the ramp 22 is raised away from contact with the floor. The right side of the tractor apparatus mirrors the details shown in FIG. 8.

Pivot assembly 42 additionally acts as a limit to forward movement of the left front wheel of the wheelchair. When the user has rolled the front wheels of the wheelchair into a position to be stopped by the pivot assembly 42 and its companion pivot assembly on the right side of the apparatus, the user knows that the wheels are in position to be clamped.

FIG. 9 illustrates a manual wheelchair 20 attached to the tractor apparatus 21 of the present invention.

Figure 10:
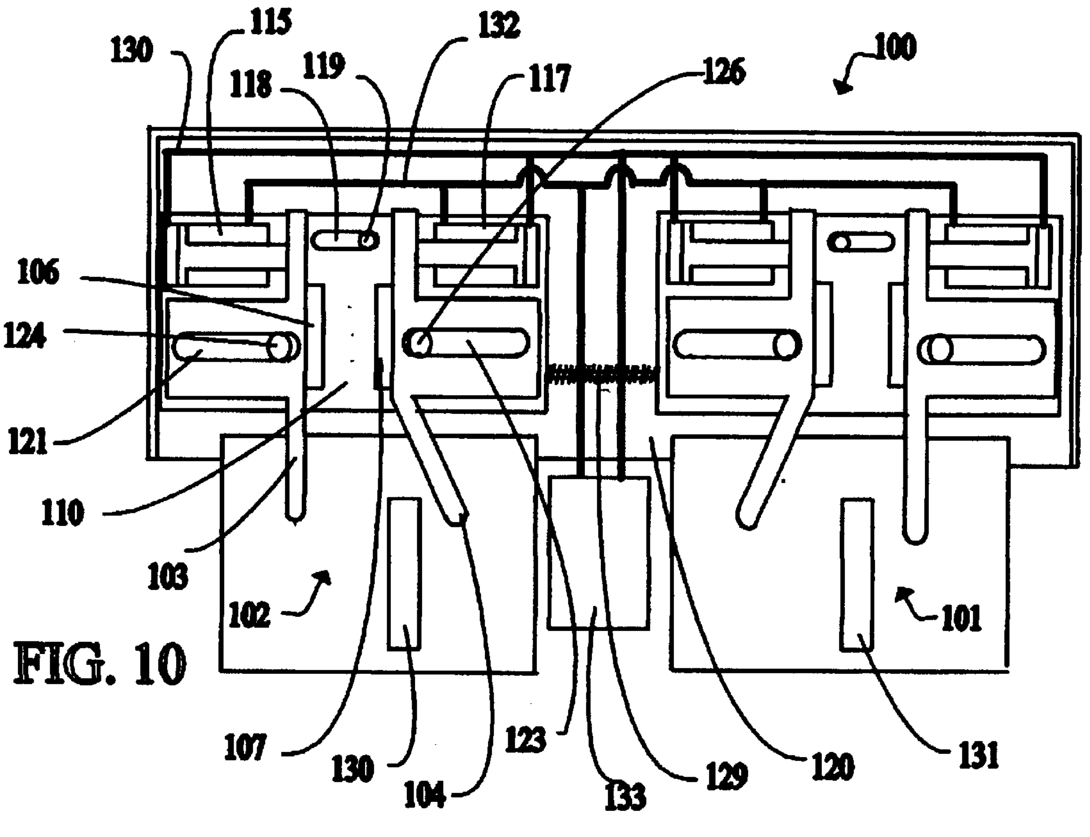
FIG. 10 is a top view of a modified tire-gripping component of the tractor apparatus of the present invention.

FIG. 10 illustrates a modified form of the tractor apparatus of the present invention indicated generally at 100, in which the clamping of the front wheels of a wheelchair is accomplished with a fluid powered clamping system rather than a cable drive system. The system 100 includes a left wheel clamp indicated generally at 102 and a right wheel clamp indicated generally at 101. The clamps 101 and 102 are float mounted on a body support member 120 permitting movement over the support 120 and relative movement toward and away from each other. The clamps 102 and 101 are similar in construction and operation and only the left side clamp 102 will be described in detail.

The clamp 102 includes a left side guide 103 and an angled right side guide 104. Wheel clamping pads 106 and 107 are carried on the interior surfaces of the guides 103 and 104, respectively. The two guides 103 and 104 are movably carried on a left side clamp carrier plate 110 that provides movable support for the clamp 102 relative to the clamp 101. A fluid powered piston-cylinder assembly 115 mounted on the plate 110 moves the guide 103 back and forth on the carrier plate 110. A similar piston-cylinder assembly 117 mounted on the plate 110 moves the guide 104 over the plate 110.

The plate 110 is mounted for limited movement over the body support 120 of the tractor apparatus 100. Slots 118 in the plate 110 cooperate with retaining guide pins 119 to secure and direct the movement of the pate 110 over the support 120. Pins 124 and 126 project from the plate 110 through slots 121 and 123 in the guides 103 and 104, respectively, to limit and guide the movement of the guides over the plate 110. A compression spring 129 biases the plate 110 away from its corresponding plate in the clamp assembly 101 urging the two floating clamp assemblies 102 and 101 to move away each other toward a position that will accept the widest wheel spacing that may be accommodated by the tractor assembly. The clamp assemblies in FIG. 9 are illustrated in position on the support 120 to receive a wheelchair having the maximum front wheel separation that may be accommodated by the tractor apparatus 100.

The tractor 100 accommodates misalignment of the front wheels of an approaching wheelchair by moving the clamp assemblies over the mount body 120 in response to an opening force exerted by the front wheel of the wheelchair. Thus, as illustrated in FIG. 9, a left front wheel 130 of a wheelchair having front wheel spacing less than the maximum acceptable spacing is illustrated engaging the guide 104 as the wheelchair is advanced into position on the tractor apparatus 100. As the wheel 130 advances toward the pads 106 and 107 of the clamp assembly 102, the wheel engagement with the inclined portion of the guide 104 moves the clamp assembly 102 toward the right until the opening between the pads 106 and 107 is in registry with the wheel 130. During this movement, the slot 118 permits movement of the plate 110 along a path dictated by the guide pin 119. A similar response occurs with a right hand wheel 131 of the wheelchair engaging the guides of the clamp 101. By virtue of the floating mount of the clamps and the spring bias between plates, the advance of either wheel 130 or 131 against the clamp guides simultaneously moves the clamp 102 and clamp 101. When the wheels have been advanced into position between the left assembly clamping pads 106 and 107 and corresponding pads of the right clamp assembly 101, the fluid actuated assemblies 115 and 117 are powered to cause the pads to close toward each other, clamping the tires of the wheels to the tractor apparatus 100.

Movement of the pads 106 and 107 is controlled by the supply of pressurized fluid to the assemblies 115 and 117. A piston-side fluid supply line 130 communicates with the piston side of the fluid powered assemblies to force the pistons in a direction closing the pads toward each other. A rod-side fluid supply line 132 supplies a powered fluid to the rod end of the assembly to move the pads away from each other. The pressure is applied from a power source 133. Pressure balancing of the fluids acting in the various piston-cylinder assemblies will automatically correctly position the pads about the wheels 130 and 131 to ensure the application of a uniform gripping force to both wheels without straining the wheel mounting of the chair.

The pressurizing fluid supply to the piston-cylinder assemblies may be either a gas or liquid. It will also be understood that the linear drive provided by the piston-cylinder assembly may be provided by suitably controlled electrically operated linear powering devices as well as other powering mechanisms.

Figure 11:
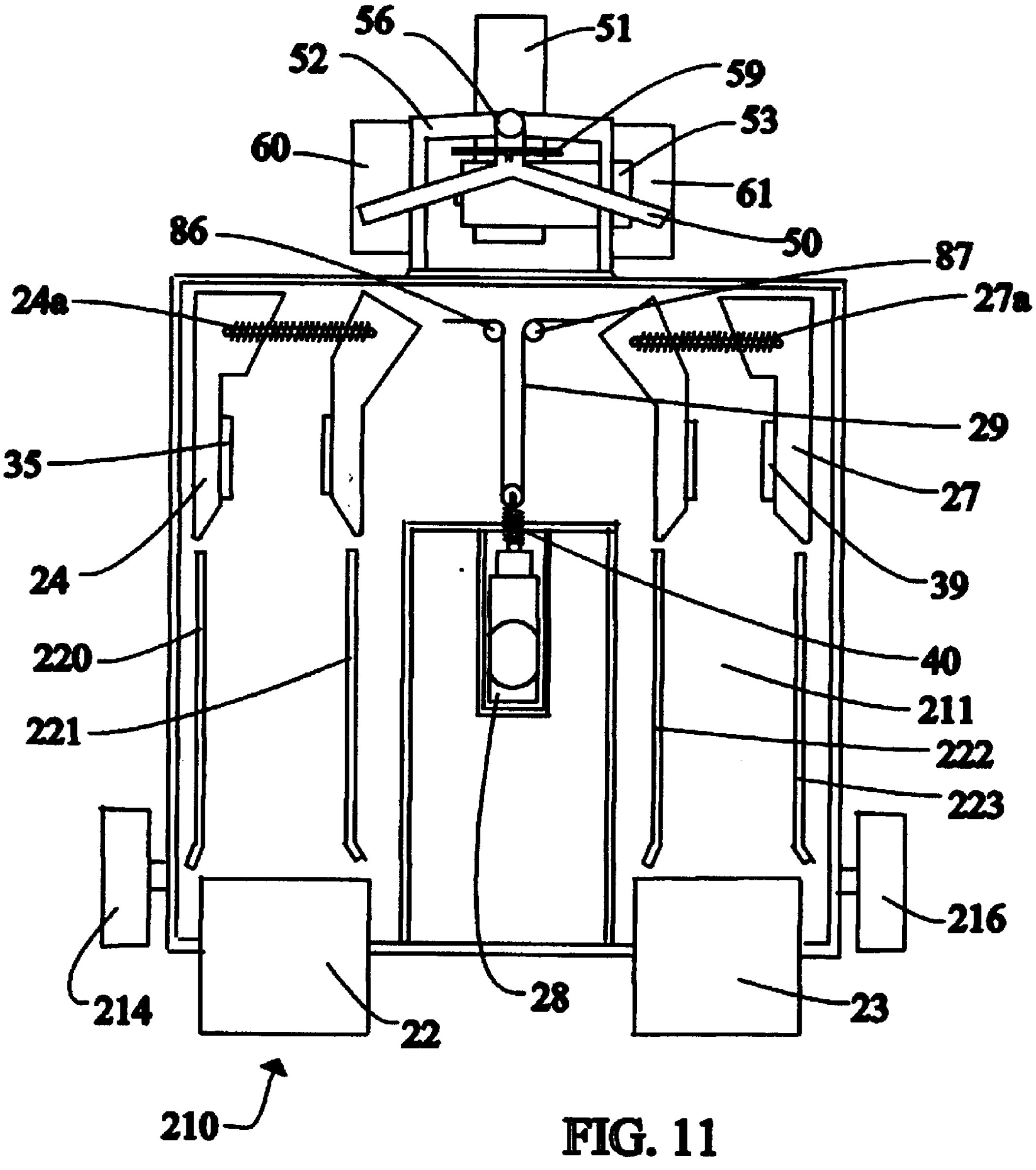
FIG. 11 is a plan view of a platform support for a wheelchair employing a; novel front wheel clamping assembly of the present invention.
Figure 12:
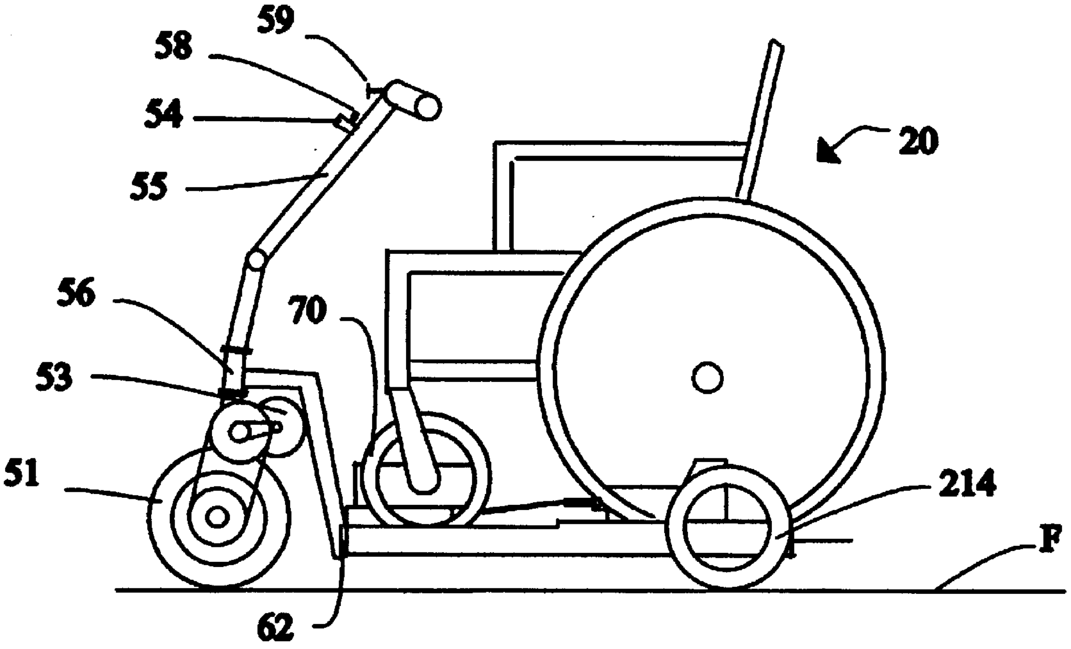
FIG. 12 is a side elevation illustrating a wheelchair mounted upon the powered platform support of FIG. 11.
Figure 13:
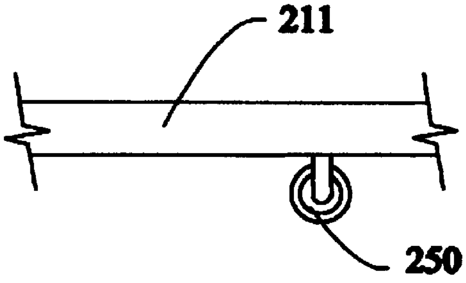
FIG. 13 is a side elevation of a castering wheel usable in a tractor apparatus of the present invention.

A modified form of the invention, indicated generally at 210, is illustrated in FIGS. 11 and 12 of the drawings. The tractor apparatus 210 depicted in FIG. 11 is designed to fully support a wheelchair as illustrated in FIG. 12. Components of the assembly 210 that are similar to those in previously described embodiments of the present invention are identified with the same reference characters. The assembly 210 includes a mounting platform 211 that is movably supported above a floor F by wheels 214, 216 and 51. Left side guide rails 220, 221 and right side guide rails 222 and 223 direct the front wheels of the wheelchair 20 into the clamping assemblies 22 and 23.

In operation, a wheelchair 20 mounts the tractor 210 by rolling up over the retractable ramps 22 and 23 and advancing over the platform 211 until the wheelchair is a completely supported on top of the tractor 210. When fully supported by the tractor 210, the front wheels 70 of the wheelchair will be properly positioned within the clamping assemblies 22 and 23. The assemblies 22 and 23 are activated as previously described to grip the front wheels of the wheelchair to secure it firmly to the tractor apparatus 210. Once the front wheels are clamped, the tractor apparatus 210 may be operated in the manner previously described to transport the wheelchair and its occupant using the tractor's self-contained power supply and steering system.

Figure of 13 illustrates a caster wheel 250 that may be employed to replace the wheels 214 and 216 of the tractor apparatus 210. The use of castering wheels permits a reduction in the footprint of the assembly 210 on the floor and also enables the tractor apparatus to turn in a smaller radius.

It will be appreciated that the present invention is not limited to the details of the foregoing illustrative embodiments and that the tractor apparatus may be embodied in other specific forms without departing from the spirit or essential attributes of the present invention. The illustrated embodiments are therefore to be considered in all respects as illustrative and not restrictive, the scope of the invention being indicated by the appended claims rather than by the foregoing illustrations and descriptions and all changes which come within the meaning and range of equivalency of the claims are therefore intended to be embraced therein.

What is claimed is:

1. A powered drive apparatus, connectable to a wheelchair, comprising:

a first wheel securing assembly carried by said powered drive apparatus for securing a first front wheel of a wheelchair to secure said powered drive apparatus to said wheelchair whereby said wheelchair may be propelled by said powered drive apparatus, a second wheel securing assembly carried by said powered drive apparatus for securing a second front wheel of said wheelchair to secure said powered drive apparatus to said wheelchair, an adjustable mechanism carried by said drive apparatus for spacing said first securing assembly relative to said second securing assembly at a spacing that will accommodate a fixed spacing between said first front wheel and said second front wheel of said wheelchair and wherein said first and second securing assemblies are movable relative to each other and relative to said towered drive apparatus as required to be properly positioned relative to said spaced front wheels of said wheelchair and to secure said front wheels when properly positioned relative to said spaced front wheels, a first access ramp for providing an access to said first front wheel of said wheelchair between a floor and a first raised wheel space on said powered drive apparatus, a second access ramp for providing an access to said second front wheel of said wheelchair between said floor and a second raised wheel space on said powered drive apparatus, a ramp retraction mechanism for retracting said first and second access ramps away from said floor when said first and second front wheels of said wheelchair are respectably in said first and second raised wheel spaces, a self-contained power supply, a steering mechanism and a wheel securing control, and wherein said adjustable spacing mechanism is actuated by power provided from said self-contained power supply.

2. A powered drive apparatus as defined in claim 1 wherein said self-contained power supply acts on said adjustable spacing mechanism through a resilient connector.

3. A powered drive apparatus connectable to a wheelchair, comprising:

a first wheel securing assembly carried by said powered drive apparatus for securing a first front wheel of a wheelchair to secure said powered drive apparatus to said wheelchair whereby said wheelchair may be propelled by said powered drive apparatus, a second wheel securing assembly carried by said powered drive apparatus for securing a second front wheel of said wheelchair to secure said powered drive apparatus to said wheelchair, an adjustable mechanism carried by said drive apparatus for spacing said first securing assembly relative to said second securing assembly at a spacing that will accommodate a fixed spacing between said first front wheel and said second front wheel of said wheelchair and wherein said first and second securing assemblies are movable relative to each other and relative to said powered drive apparatus as required to be properly positioned relative to said spaced front wheels of said wheelchair and to secure said front wheels when properly positioned relative to said spaced front wheels, a first access ramp for providing an access to said first front wheel of said wheelchair between a floor and a first raised wheel space on said powered drive apparatus, a second access ramp for providing an access to said second front wheel of said wheelchair between said floor and a second raised wheel space on said powered drive apparatus, a ramp retraction mechanism for retracting said first and second access ramps away from said floor when said first and second front wheels of said wheelchair are respectably in said first and second raised wheel spaces, a self-contained power supply, a steering mechanism and a wheel securing control, and wherein said adjustable spacing mechanism is actuated by a pressurized fluid pressurized with power provided from said self-contained power supply.

4. A powered drive apparatus ac defined in claim 1 connectable to a wheelchair, comprising:

a first wheel securing assembly carried by said powered drive apparatus for securing a first front wheel of a wheelchair to secure said powered drive apparatus to said wheelchair whereby said wheelchair may be propelled by said powered drive apparatus, and wherein said first securing assembly comprises clamping members faced with a pliable facing that conforms around tires and rims of wheelchair front wheels of different width and diameters.

5. A powered drive apparatus as defined in claim 4 having multiple points securing said drive apparatus to said wheelchair.

6. A powered drive apparatus connectable to a wheelchair, comprising:

a first wheel securing assembly carried by said powered drive apparatus for securing a first front wheel of a wheelchair to secure said powered drive apparatus to said wheelchair whereby said wheelchair may be propelled by said powered drive apparatus, and wherein an inexact alignment of said first front wheelchair wheel with a clamping member comprising said first wheel securing assembly is accommodated by an adjustable clamping mechanism for attachment of said wheelchair to said drive apparatus.

7. A powered drive apparatus as defined in claim 6 having independently free-floating clamps to attach said drive apparatus to first and second front wheels of said wheelchair.

8. A powered drive apparatus connectable to a wheelchair, comprising:

a first wheel securing assembly carried by said powered drive apparatus for securing a first front wheel of a wheelchair to secure said powered drive apparatus to said wheelchair whereby said wheelchair may be propelled by said powered drive apparatus, and having self-retracting ramps for mount and dismount of said drive apparatus wherein activation of ramp retraction is brought about by the weight exerted by two front wheels of said wheelchair.

9. A powered drive apparatus connectable to a wheelchair, comprising:

a first wheel securing assembly carried by said powered drive apparatus for securing a first front wheel of a wheelchair mounted to a frame of said wheelchair to secure said powered drive apparatus to said wheelchair whereby said wheelchair may be propelled by said powered drive apparatus, and wherein said drive apparatus secures directly to said front wheel of said wheelchair without connection to the frame and without imposing lateral or torsional stress on the frame of said wheelchair.

* * * * *